INVENTOR.
JOHN O. SEMMELMAN

United States Patent Office 3,423,831
Patented Jan. 28, 1969

3,423,831
COMPOSITE ARTIFICIAL TOOTH
John O. Semmelman, York, Pa., assignor to The Dentists' Supply Company of New York, York, Pa., a corporation of New York
Filed June 27, 1966, Ser. No. 560,541
U.S. Cl. 32—8
Int. Cl. *A61c 13/08*
6 Claims

ABSTRACT OF THE DISCLOSURE

A composite artificial tooth comprising in combination a dental ceramic portion and a synthetic resin portion, the synthetic resin portion comprising at least a portion of the ridge lap surface of the tooth and extending longitudinally therefrom at least one-half of the mesial and distal surfaces and alternatively, additionally, at least one-half of the exposed lingual surface. The synthetic resin portion and dental ceramic portion are chemically united at their interface by a silane bonding agent.

---

Such a composite tooth allows ready alteration and ease of bonding to a synthetic resin denture base in addition to excellent strength characteristics.

The present invention relates generally to an artificial tooth product and, more particularly, to an improved composite of porcelain and plastic as an artificial tooth.

There has been a long history of artificial teeth being made, first from porcelain and, then, plastic. Each of these materials has its own advantages and limitations. Some of the most successful prosthetic appliances have combined porcelain teeth with a plastic base material which can be easily adapted to the soft tissue of the oral cavity. Individuals have attempted, less satisfactorily, to add ceramic powders to the plastic from which artificial teeth are moulded but this generally has resulted in a product which is inferior to either porcelain or plastic by itself. Other material blends have been made for filling cavities in artificial teeth where there is a solid packing of ceramic particles with barely enough plastic to fill the interstices.

Very recently, a type of chemical, known as "silane" has been applied to dentistry in order to produce an adhesive bond between the plastic portion and porcelain portion of a composite artificial tooth. Such application of these materials can be found in a copending application, Ser. No. 425,080 and now Patent No. 3,369,297, issued Feb. 20, 1967. The chemical union between the porcelain and plastic resulting from a silane chemical bond has greatly increased the potential for composite artificial teeth to be made successfully with the porcelain being either in particulate, or massive form.

For example, solid porcelain teeth have been made with silane treated surfaces so that the solid porcelain teeth could be secured directly to a plastic denture base through the chemical adhesion of the silane treated surfaces. However, in practice it is often necessary for the dentist or technician to grind away a portion of the teeth in order to adapt the artificial tooth to the space available in different individuals' mouths. Therefore, a substantial portion of the silane treated surfaces was ground away and its bonding effectiveness lost. While previous mechanical anchorages, i.e., metal pins or undercut diatorics, imposed some limitation on the amount of grinding that could be done in the anchorage area, even a superficial grinding of the silane treated surfaces was found to be enough to remove all its potential for chemical anchorage. For this reason, such treated solid porcelain teeth, while extremely strong and esthetic, have been found unsatisfactory and have not been adopted by the industry.

Still more recently, composite (porcelain and plastic) artificial teeth have taken advantage of the chemical union potential of silanes by being designed in a crown form. Examples of such artificial teeth can be found in copending application Ser. No. 481,191.

In these teeth, a porcelain shell comprising all of the exposed tooth surfaces, was treated internally with a silane coating and filled with a core of conventional tooth plastic. Such a composite tooth can be ground on the ridge contacting surface to permit fitting to the tissues of an individual patient without destroying the silane interface. In fact, the tooth can be shortened to a rather drastic extent, only reducing the length of the plastic core and the silane-coated interface proportionately to the reduction in tooth length. However, such a tooth suffers somewhat because the plastic core and the lingual porcelain surface has to be extremely thin in the usual overbite case, and cannot be ground lingually to provide more space behind the upper anterior teeth for the lower teeth.

It has been found that the artificial composite teeth, as shown in copending Ser. No. 481,191, can be improved with respect to their grinding and adaptation characteristics by forming the composite tooth with only the labial (or buccal) and incisal (or occlusal) surfaces being made of porcelain with the entire, or a part, of the lingual and ridge lap portions of the tooth being made of dental plastic. In general, at least a portion of the ridge lap surface and the wall surfaces of the composite tooth extending therefrom advantageously comprise a synthetic dental plastic, or resin, material with the outer visual surface, labial or buccal, and the biting, or masticating surface, incisal or occlusal, being composed of dental ceramic material. The porclain labial or buccal provides excellent esthetics, color stability, resistance to chemical attack and protects against loss of surface gloss while the porcelain incisal or occlusal portion provides excellent resistance to abrasive wear. On the other hand, the lingual and ridge lap areas being of plastic permits exceptional ease of alteration both lengthwise and in thickness, to provide space for an overbite, etc., as well as being chemically bondable to the denture base plastic.

It is, therefore, a principal object of the present invention to provide an improved composite plastic and porcelain artificial tooth having desirable alteration characteristics.

It is a further object of the present invention to provide a composite artificial tooth wherein the lingual and ridge lap areas are entirely, or partly, plastic.

It is yet a further object of the present invention to provide such artificial composite tooth having the lingual and ridge areas composed entirely, or in part, of plastic wherein the plastic and porcelain portions of the tooth are chemically united at their interface by silane bonding agents.

It is still a further object of the present invention to provide such composite artificial teeth wherein the chemical union of porcelain and plastic is reinforced by or replaced with, a mechanical connection.

Still further objects and advantages of the artificial composite teeth of the present invention will become more apparent from the following more detailed description of the invention and accompanying drawings wherein.

Referring to the drawings, like numerals represent like elements.

Figure 1:
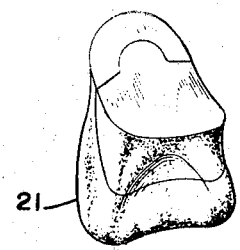
FIGURE 1 is a lingual perspective view of an anterior tooth according to the present invention.
Figure 2:
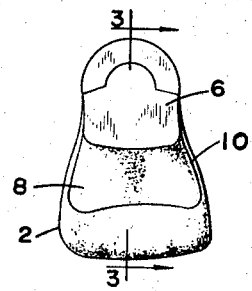
FIGURE 2 is a rear or lingual elevation view of the anterior tooth of FIGURE 1.
Figure 3:
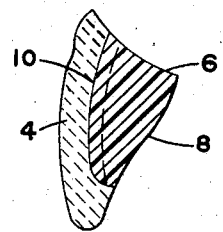
FIGURE 3 is a labiolingual cross sectional view of an anterior tooth according to the present invention, taken along line 3—3 of FIGURE 2.

In FIGURES 1–3, numeral 21 designates an anterior tooth according to the present invention, wherein the labial surface 4 and incisal surface 2 are composed of dental porcelain. In general, the dental porcelain can comprise any conventional dental ceramic material, e.g., feldspatic, nepheline syenite and synthetic porcelains. The nature of these esthetic porcelains is fully set forth in copending Ser. No. 481,191. The ridge lap surface 6 and lingual surface 8 comprise principally a synthetic dental plastic or resin material, with the lower extremity of the plastic or resin being proximate to the incisal edge. The resin portion extends incisally from the ridge lap surface 6 along the lingual surface 8 of the tooth. Advantageously, the resin portion extends longitudinally for at least one-half the length of the tooth to brace against flexure and absorb any shocks and the plastic, or resin, extends at least one-half of the exposed length of the lingual surface. The dental plastic of the ridge lap surface 6 and lingual surface 8 can be any resinous material having the requisite physical characteristics for the production of a plastic artificial tooth, being compatible and copolymerizable with the denture base material and possessing, when a silane bonding agent is employed, the capability of copolymerizing with the reactive silane chemical bonding agent to produce a strong chemical and diffusion bond between the plastic and porcelain portions of the composite tooth. Such materials include, for example, the polymerized methacrylates, e.g., methyl polymethacrylate, ethyl polymethacrylate, propyl polymethacrylate, butyl polymethacrylate; the polymerized acrylates, e.g., methyl polyacrylate; polymerized hydrocarbons; polyesters; vinyl polymers, e.g., polvinyl acetate, polyvinyl chloride; polycarbonates; epoxy resins; and mixtures of such materials and copolymers of the polymerizable monomers.

While polymerized methyl methacrylate has been generally employed as the plastic insert, or core, in composite artificial teeth, it has been found that unfavorable stresses from polymerization shrinkage of the plastic and resultant weakening of the composite tooth can be minimized by using a more elastic type of plastic in the lingual portion of the tooth. Such a "softer" plastic is less capable of imparting stress to the chemically bonded porcelain. A typical example of such a plastic is one of the softer methacrylate resins, such as ethyl methacrylate, butyl methacrylate, acrylates, or appropriate copolymers of any of the foregoing with methyl methacrylate. Such resins previously have not been considered appropriate for artificial teeth but are suitable, for the first time, in a composite tooth where the wear-supporting surfaces are of a hard and resistant porcelain. The use of such softer copolymers on the lingual and ridge areas is especially advantageous because in the process of bonding conventional methacrylate denture material to the plastic portion of artificial teeth, the softer resins are more easily attacked by the monomer phase from the denture base material and a more perfect chemical union is more easily formed. Recent trends in dental plastics toward cross linkage had increased the resistance of these materials to solvent attack, and thereby made the problem of bonding teeth to denture material more difficult; now, with the new softer plastic linguals, this trend can be reversed and the bond made with greater surety. Accordingly, the use of these softer resins which are yielding under polymerization stresses is a preferred embodiment of the present invention.

Still a further preferred embodiment of the present invention comprises minimizing and annealing unfavorable stresses induced by the polymerization and thermal cycles of the plastic preparation of the porcelain-plastic composite—by controlling the polymerization and thermal cycles by the use of an autocuring type of plastic. Although it is not completely known whether the thermal history of the autocuring temperature cycle results in a lesser temperature being obtained and thermal contraction thereby minimized, or if the autocuring process is initially an incomplete one and final shrinkage is accomplished very gradually by evaporating or leaching away of the unreacted monomer phase, it has been clearly established that the net result of using an autocure plastic is a stronger artificial tooth.

In FIGURES 1–3, the porcelain-plastic interface containing the chemical bonding agent is designated as 10. As stated previously, the chemical bonding agents that have been adapted for use in porcelain-plastic composites are the silane materials which, in general, correspond to the formulae $RSiX_3$, $R_2SiX_2$, and $R_3SiX$ wherein X is selected from the halogen, alkoxy and hydroxyl groups and other groups reactable with silanol, and wherein R is selected from the vinyl, methacrylate, allyl, methallyl, itaconate, maleate, acrylate, aconitate, fumarate, alkyl, aryl, alkenyl, crotonate, cinnamate and citroconate, sorbate and glycidyl groups. Examples of the compounds which may be utilized include the following: vinyl dimethyl chlorosilane, vinyl dimethyl methoxy silane, divinyl chloromethyl silane, vinyl trichlorosilane, vinyl dichloromethyl silane, 3-(trimethoxysilyl)propyl methacrylate or cinnamate, 3 - glycidoxypropyl trimethoxy silane, bis glycidoxy propyl dimethyl disiloxane, trimethoxyvinyl silane, tri(methoxyethoxy)vinyl silane, triethoxyvinyl silane, vinyl silyl triacetate, gamma-methacryloxypropyl trimethoxysilane, trimethoxyallyl silane, diallyl diethoxysilane, allyl triethoxysilane, 3-(methoxydimethylsilyl)propyl allyl fumarate, 3-(chlorodimethylsilyl)propyl methacrylate and either the 3-(trimethoxysilyl)propyl allyl maleate, fumarate, itaconate or sorbate, vinyl-tris(beta-methoxyethoxy) silane, beta - (3,4-epoxycyclohexyl)ethyl triethoxysilane, diphenyl diethoxysilane, amyl triethoxysilane, acrylato-tris-(methoxysilane).

Instead of using the simple silane or disiloxane derivatives listed above, I may also use appropriately substituted polysiloxanes. Depending on the nature of this polysiloxane, the adhesive bond may have some elastomeric character.

A full discussion of the applicable silane bonding agents and their employment can be found in the copending application Ser. No. 481,191. The chemical bonding agent need only be employed in an amount sufficient to produce a layer of a few molecules in thickness at the interface of the porcelain and plastic portions of the composite artificial tooth.

Illustrating how the silane enhances this particular design of tooth: a conventional porcelain anterior tooth with pin anchorage can withstand a linguolabial breaking force of approximately 18 lbs. A conventional plastic artificial tooth of the same size and configuration with a plastic-to-plastic denture anchorage withstands approximately 30–35 lbs. However, a porcelain-silane-plastic composite has been measured as having a strength of 40–45 lbs.

A preferred embodiment of the present invention is thus shown in FIGURES 1–3 wherein the entire lingual 8 and ridge lap 6 surfaces of the composite tooth are composed of the dental plastic material. This affords maximum available bonding area for bonding of the tooth to the plastic denture base and a large area which can be altered both in thickness and in length to fit the particular needs of an individual's mouth. Although it is not necessary for the entire ridge lap and lingual surfaces to be composed of the dental plastic material, e.g., suitable composite tooth can be prepared with only a portion of one or both surfaces of the plastic material, the embodiment shown in FIGURES 1–3 is preferred. In addition, the plastic on the distal and mesial surfaces adds to the bonding ability of the composite tooth to the plastic denture base.

Figure 4:
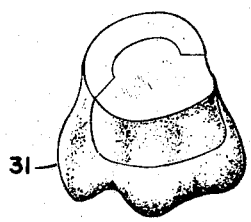
FIGURE 4 is a rear or lingual perspective view of a posterior tooth according to the present invention.
Figure 5:
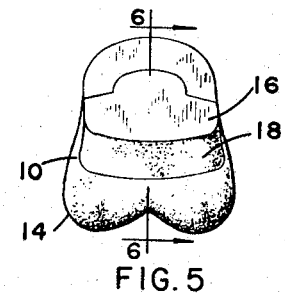
FIGURE 5 is a rear or lingual elevation view of the posterior tooth of FIGURE 4.
Figure 6:
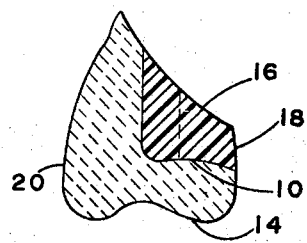
FIGURE 6 is a buccolingual cross sectional view of a posterior tooth, according to the present invention, taken along line 6—6 of FIGURE 5.

A posterior tooth 31, according to the present invention, is shown in FIGURES 4–6. In the posterior tooth 31 shown in FIGURES 4–6, the buccal surface 20 and occlusal surface 14 are composed of esthetic porcelain material such as described with respect to FIGURES 1–3. The ridge lap surface 16 and lingual surface 18 are composed entirely of synthetic dental plastic, or resin, with the lower extremity of the plastic resin being proximate to the occlusal surface. The suitable plastics again are the same as those which can be employed in composite enterior tooth shown in FIGURES 1–3. Again, the soft plastics, i.e., polymerized higher polymethacrylate, etc. and autocured resins, are preferred embodiments.

Another aspect of the present discovery is that in previous experimental configurations the strength of porcelain composite tooth was weakened by unfavorable stresses resulting from the position of the plastic tooth portion. This was especially true where the silane and plastic were placed internally as in the previously employed crown form. It has been found that the stress distribution and resultant strength of the composite tooth is considerably better when the porcelain-silane-plastic interface is an onlay rather than an inlay, or is substantially flat, slightly concave, or even a moderately shallow diatoric design.

Figure 7:
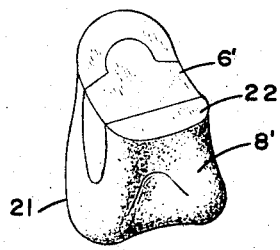
FIGURE 7 is a rear, or lingual, perspective view of an anterior tooth showing an alternate embodiment of the present invention.
Figure 8:
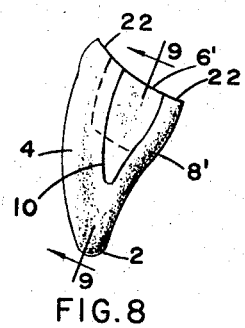
FIGURE 8 is a side elevation view of the anterior tooth of FIGURE 7.
Figure 9:
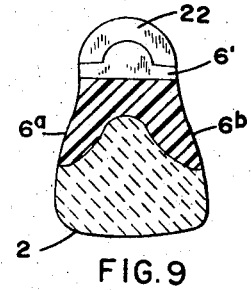
FIGURE 9 is a mesiodistal sectional view taken along line 9—9 of FIGURE 8.

FIGURES 7–9 illustrate an anterior tooth 21 showing a further embodiment of the present invention. As seen especially in FIGURE 9, a saddle-shaped onlay having an uppermost surface comprising a portion of the ridge lap surface 6' is formed from a dental plastic material as set forth in FIGURES 1–6; however, the portions of the tooth having the lingual 8', labial 4 and incisal 2 surfaces and labial and lingual portions of the ridge lap surface 22, are composed of porcelain. The resin portion extends incisally from the ridge lap surface 6' to the mesial and distal side surfaces 6a and 6b of the tooth. The plastic ridge lap surface 6' allows adequate bonding to the denture base which bonding is further enhanced by the areas of plastic on the mesial and distal surfaces 6a and 6b of this "saddle" type onlay configuration. The plastic portion of the mesial and distal surfaces of the composite tooth is readily bonded to the denture base as the same extends into the interproximal space between the teeth of a denture. Such an onlay design produces a composite tooth of substantially the same strength as the preferred embodiment although the tooth may be slightly less desirable in respect to its versatility and adaptability to excessive grinding.

Figure 10:
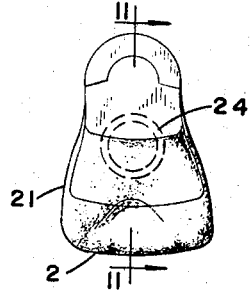
FIGURE 10 is a rear, or lingual, elevation view of an anterior tooth showing a further alternate embodiment of the present invention.
Figure 11:
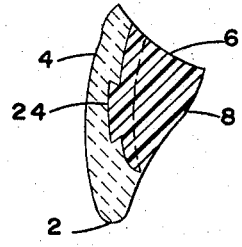
FIGURE 11 is a labiolingual cross sectional view taken along line 11—11 of FIGURE 11.
Figures 12, 13:
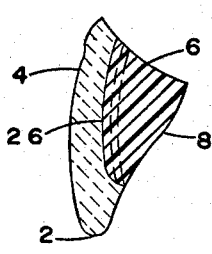
FIGURE 12 is a rear, or lingual, elevational view of an anterior tooth showing a further embodiment of the present invention.
FIGURE 13 is a labiolingual cross sectional view taken along line 13—13 of FIGURE 12.

Mechanical connections that can be used in lieu of a chemical bond, or in addition thereto are shown in FIGURES 10–13, wherein FIGURES 10–11 show a shallow diatoric 24 while FIGURES 12–13 illustrate an alternative dovetail mechanical connection 26. Such configurations afford reasonable degrees of strength by themselves and substantially more where a combination of mechanical and chemical bonds is employed.

Figure 14:
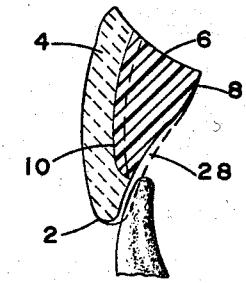
FIGURE 14 is a labiolingual sectional view of an upper anterior tooth in overbite relationship to a lower anterior tooth after grinding.

In FIGURE 14, the advantages of the composite teeth of the present invention are clearly shown by representation of an upper anterior tooth after grinding in an overbite relationship. The interface 10 between the porcelain and plastic portions of the composite tooth has not been altered in grinding away portion 28 to meet the particular requirements of an individual's mouth. Moreover, the extensive plastic areas on the lingual 8 and ridge lap 6 surfaces of the composite tooth allow for quick and convenient grinding or shaping and strong bonding between the composite tooth and the plastic denture base, while the porcelain incisal 2 and labial 4 surfaces provide a strong, resistant, esthetic surface.

The following illustrates methods of preparation of the composite artificial teeth of the present invention:

The first step in manufacture involves molding an enamel veneer between a front mold and a shader mold from a porcelain dough consisting of approximately 97% raw orthoclase feldspar of approximately 200 mesh particle size, 3% of finely ground silica or sand (400 mesh or finer), gray inorganic pigments and additional organic plasticizers and binding agents with sufficient water to render these materials plastic and easily formed by hand, yet capable of heat-induced hardening to form a biscuit which will withstand reasonable handling prior to vitrification or fusion. This paste is placed in the front mold part, the shader mold part is added thereto, the filled mold assembly is vibrated to condense the porcelain mixture and then heated under pressure to a temperature substantially above that needed to volatilize the water plasticizer and render the biscuits hard. At this point the mold is cooled and the shader mold part is removed, leaving the shaped, hardened enamel veneers in the front mold part. Meanwhile a second porcelain is compounded from approximately 80% raw orthoclase feldspar ground to approximately 200 mesh, and 20% silica or sand ground to finer than 400 mesh. This porcelain is modified with yellow and other inorganic pigments as needed to simulate the varying shades of natural tooth dentine and also is modified with necessary plasticizers, binders, and water to render it into a moldable mass. The enamel veneers in the base mold are filled with this dentine-colored porcelain, and the mold assembly is completed with the back mold half, or perhaps a second shader to shape an inner surface of tooth dentine. This combined mold assembly is reheated to a temperature necessary to volatilize water and harden the composite tooth biscuit.

At this stage, the porcelain portion of the tooth in biscuit form (unfired—simply baked) is complete and it is removed by opening the mold or withdrawing any undercut mold portions separately. These preformed, preblended, and preshaded porcelain biscuits next are arranged upon refractory trays and are subjected to furnace temperatures and atmospheres as necessary to cause sintering, condensation, shrinkage and vitrification. In general, this requires a temperature of approximately 2350° F. for a time of at least 15 minutes; the complete firing cycle from beginning to end will be approximately 60–90 minutes, which will include the times necessary to gradually raise the temperature and oxidize the organic binders, etc. from the porcelain, apply vacuum or special atmospheres as may be necessary to permit thorough sintering and condensation, completely fuse the mass at the peak temperature and time, and finally pass through the cooling cycle slowly enough that the porcelain will not be thermally shocked and cracked.

The fused porcelain teeth are then exposed to boiling water for approximately one hour to ensure that silica molecules on the surface have had an opportunity to be hydrolyzed and thus made receptive for silane bonding. Excess water is removed by drying and the appropriate anchorage surfaces of the tooth then are painted with a mixture of 1% trimethoxysilyl proply methacrylate and 99% hexane, modified with 0.2% acetic acid. This solution may be applied several times, if necessary, to ensure that all anchorage surfaces are adequately covered and the coated tooth then is allowed to air dry for 2 hours and is heated for 5 minutes at 230° F. to ensure complete elimination of the hexane diluent.

The porcelain or ceramic part of the tooth made in accordance with the foregoing exemplary procedure is ready for application of the plastic portion. After the ceramic part of the composite tooth has been prepared and silane coated in accordance with the above procedure, the ridge lap and lingual portions of the porcelain portion, or veneer, of the tooth is filled with a liquid consisting of 95% of methyl methacrylate monomer and 5% ethylene glycol dimethacrylate cross-link agent. This monomer is mixed with a 50–50 ethyl-methyl methacrylate copolymer sufficient to produce a saturated gel. All percentages are by liquid weight. This gel subsequently is cured by using heat and pressure techniques well known in the dental industry so as to result in a hard, finished mass which is capable of being ground trimmed or shaped, as may be necessary, and yet will be susceptible to chemical bonding by the plastic monomers in conventional denture base resins.

A further embodiment 2 may be manufactured as follows: interdigitating front and shader molds are used with a porcelain paste composed of 98% orthoclase feldspar combined with 2% of a highly purified refractory oxide such as alumina ($Al_2O_3$). These two ceramic materials have been previously fritted together and ground to approximately 200 mesh and mixed with appropriate plasticizing materials, etc., to result in a moldable mass (dough) as before recited. Following biscuiting of the enamel veneer, a second porcelain mix is compounded of 80% orthoclase feldspar and 20% highly purified aluminum oxide and is fritted to a temperature sufficient to cause vitrification and subsequently is ground to approximately 20 mesh. This powder is mixed with appropriate inorganic oxide pigments, plasticizing agents, lubricants. etc., and is molded or shaped inside the enamel veneer which is between the front mold part and a back mold part. After sufficient heating to cause the enamel and dentine biscuits to harden together, the mold is separated and the blended enamel and dentine tooth biscuits are removed, fired as previously described, and the finished porcelain teeth are ready for the treatment with the silane bonding agent.

As before, the vitrified porcelains are exposed to water to complete the hydrolysis of the oxide alumina and silica molecules in the surface, excess water is subsequently removed by drying, and the ridge and anchorage surfaces are painted with a liquid mixture of 2% of a vinyl trichlorosilane in 98% acetone. This surface subsequently is dried by heating under an infrared lamp or alternative substitute means, and the partial tooth is ready for incorporation of its plastic portion.

The plastic portion is prepared as follows: 67% by weight of ethyl methacrylate polymer, 30% by weight ethyl methacrylate monomer, 3% by weight of allyl methacrylate and 0.1% dimethyl paratoluidene are mixed into a fresh, sticky gel which is packed into the lingual and ridge portions of the silane-treated porcelain preform. This composition is capable of autocuring within about 10–15 minutes to a semirubbery polymer which is easily ground and bonded to the denture base material. It may be exposed to supplemental pressure during cure to enhance density. The completed composite tooth may be oven-treated to remove any residual monomer remaining from the polymerization reaction and anneal unfavorable stresses from the final product.

A third procedure comprises preparing a blended porcelain veneer or enamel-simulating portion in accordance with either of the previous examples. However, prior to firing or fusing a shallow, undercut diatoric hole, for example, is cut or possibly can be molded into the linguai-incisal surface of the veneer biscuit. The biscuit subsequently is fired, as before, at 2350° F. for 15 minutes. The water treatment, prior to applying the silane, may be eliminated as sufficient atmospheric moisture normally is present to hydrolyze the silica atoms in the porcelain and render them receptive to chemical union with the silane. A 3% mixture of trimethoxysilyl propyl methacrylate with 97% toluene is painted over the inner surface of the fused porcelain using a fine sable brush and three generous applications are applied, allowing the excess solvent to evaporate after each application.

The prepared veneer is invested in a gypsum mold, according to normal dental practice, leaving a preformed lingual cavity to be filled with the plastic tooth portion. This mold is packed with a freshly mixed gel consisting of 70%, by weight of a 75/25 methyl-butyl methacrylate polymer, 27% by weight methyl methacrylate monomer, 3% by weight trimethyl propane trimethacrylate. After completing the packings, the flask is closed finally in a spring clamp, in accordance with known procedure and is cured in boiling water for 30 minutes. The completed teeth are removed from the flask and are tumbled and shell-blasted to remove unwanted surface contaminants prior to final carding and sale.

While certain preferred embodiments have been illustrated, it is to be understood that the invention is in no way to be deemed as limited thereto but should be considered as broadly as all or any equivalents thereof.

I claim:
1. A composite artificial tooth capable of being readily altered and easily bonded to a synthetic resin denture base comprising, in combination, a dental ceramic portion and a synthetic resin portion, said synthetic resin portion comprising at least a portion of the ridge lap surface of said tooth and extending longitudinally therefrom at least one-half the length of the mesial and distal surfaces, the remaining surface of said tooth comprising said dental ceramic portion, said synthetic resin portion being chemically connected to said dental ceramic portion by a silane bonding agent.

2. The composite artificial tooth of claim 1 wherein said silane bonding agent is enhanced by a mechanical connection.

3. The composite artificial tooth of claim 1 wherein said silane bonding agent is selected from the group consisting of compounds of the formulae $RSiX_3$, $R_2SiX_2$, and $R_3SiX$ wherein X is selected from the halogen, alkoxy and hydroxyl groups and R is selected from the vinyl, methacrylate, allyl, methallyl, itaconate, maleate, acrylate, aconitate, fumarate, alkyl, aryl, alkenyl, crotonate, cinnamate and citroconate, sorbate and glycidyl groups.

4. A composite artificial tooth capable of being readily altered and easily bonded to a synthetic resin denture base comprising, in combination, a dental ceramic portion and a synthetic resin portion, said synthetic resin portion comprising at least a portion of the ridge lap surface of said tooth and extending longitudinally therefrom at least one-half the length of the mesial and distal surfaces and at least one-half the exposed lingual surface, the remaining surface of said tooth comprising said dental ceramic portion, said synthetic resin portion being chemically connected to said dental ceramic portion by a silane bonding agent.

5. The composite artificial tooth of claim 4 wherein said silane bonding agent is enhanced by a mechanical connection.

6. The composite artificial tooth of claim 4 wherein said silane bonding agent is selected from the group consisting of compounds of the formulae $RSiX_3$, $R_2SiX_2$, and $R_3SiX$ wherein X is selected from the halogen, alkoxy and hydroxyl groups and R is selected from the vinyl, methacrylate, allyl methallyl, itaconate, maleate, acrylate, aconitate, fumarate, alkyl, aryl, alkenyl, crotonate, cinnamate and citroconate, sorbate and glycidyl groups.

References Cited

UNITED STATES PATENTS

| | | | |
|---|---|---|---|
| 2,419,089 | 4/1947 | Myerson et al. | 32—8 |
| 3,052,583 | 9/1962 | Caristrom. | |
| 3,288,893 | 11/1966 | Stebleton. | |

ROBERT PESHOCK, *Primary Examiner.*

UNITED STATES PATENT OFFICE
CERTIFICATE OF CORRECTION

Patent No. 3,423,831 January 28, 1969

John O. Semmelman

It is certified that error appears in the above identified patent and that said Letters Patent are hereby corrected as shown below:

Column 1, after line 21, cancel the bold line and insert the same after line 26, same column 1. Column 3, line 64, "polvinyl" should read -- polyvinyl --. Column 7, line 9, "proply" should read -- propyl --; line 47, "20" should read -- 200 --.

Signed and sealed this 24th day of March 1970.

SEAL)
Attest:

Edward M. Fletcher, Jr.
Attesting Officer

WILLIAM E. SCHUYLER, JR.
Commissioner of Patents